US006507019B2

(12) United States Patent
Chernushevich et al.

(10) Patent No.: US 6,507,019 B2

(45) Date of Patent: Jan. 14, 2003

(54) MS/MS SCAN METHODS FOR A QUADRUPOLE/TIME OF FLIGHT TANDEM MASS SPECTROMETER

(75) Inventors: Igor Chernushevich, Etoobicoke (CA); Bruce Thomson, North York (CA)

(73) Assignee: MDS Inc., Concord (CA)

( * ) Notice: Subject to any disclaimer, the term of this patent is extended or adjusted under 35 U.S.C. 154(b) by 0 days.

(21) Appl. No.: 09/864,872

(22) Filed: May 25, 2001

(65) Prior Publication Data

US 2002/0030159 A1 Mar. 14, 2002

Related U.S. Application Data

(63) Continuation-in-part of application No. 09/316,388, filed on May 21, 1999, now Pat. No. 6,285,027.

(51) Int. Cl.[7] .......................... B01D 59/44; H01J 49/00

(52) U.S. Cl. ...................................................... 250/287

(58) Field of Search .......................................... 250/287

(56) References Cited

U.S. PATENT DOCUMENTS

| | | | | |
|---|---|---|---|---|
| 5,032,722 A | | 7/1991 | Boesl et al. | 280/287 |
| 5,689,111 A | | 11/1997 | Dresch et al. | 280/287 |
| 5,763,878 A | | 6/1998 | Franzen | 250/292 |
| 6,011,259 A | * | 1/2000 | Whitehouse et al. | 250/287 |
| 6,020,586 A | | 2/2000 | Dresch et al. | 250/287 |
| 6,194,717 B1 | * | 2/2001 | Hager | 250/282 |
| 6,204,500 B1 | * | 3/2001 | Whitehouse et al. | 250/282 |

FOREIGN PATENT DOCUMENTS

| | | | |
|---|---|---|---|
| WO | 98/07177 | 2/1998 | H01J/49/00 |
| WO | 98/07178 | 2/1998 | H01J/49/00 |

OTHER PUBLICATIONS

Matthias Wilm, et al., "Parent Ion Scans of Unseparated Peptide Mixtures", Analytic Chemistry, vol. 68, No. 3, Feb. 1, 1996.

Whitehouse, Craig, et al. "A Two Dimensional Ion Trap API TOF Mass Spectrometer", Abstract from the Proceeding of the 46$^{th}$ ASMS Conference on Mass Spectrometry and Associated Topics, Orlando, Florida, May 31,–Jun. 4, 1998.

Andrien, Bruce A., Jr., et al., Increasing the Duty Cycle for Time–Of–Flight by Trap–Pulse Mode, Abstract from the Proceeding of the 46$^{th}$ ASMS Conference, Dallas, Texas, Jun. 13–17, 1999.

* cited by examiner

*Primary Examiner*—John R. Lee
*Assistant Examiner*—Johnnie L. Smith, II
(74) *Attorney, Agent, or Firm*—Bereskin & Parr

(57) ABSTRACT

There is provided a method of effecting mass analysis on an ion stream, the method comprising passing the ion stream through a first mass resolving spectrometer, to select parent ions having a first desired mass-to-charge ratio. The parent ions are then subject to collision-induced dissociation (CID) to generate product ions, and the product Ions and any remaining parent ions are trapped the CID and trapping can be carried out together in a linear ion trap. Periodically pulses of the trapped ions are released into a time of flight (TOF) instrument to determine the mass-to-charge ratio of the ions. The delay between the release of the pulses and the initiation of the push-pull pulses of the TOF instrument are adjusted to maximize the duty cycle efficiency and hence the sensitivity for a selected ion with a desired mass-to-charge ratio. This technique can be used to optimize the performance for a parent ion scan, and MRM scan or a neutral loss scan.

16 Claims, 11 Drawing Sheets

Tryptic digest of myoglobin

Parent ion scan for m/z = 86; no trapping

Parent ion scan for m/z = 86; with trapping

MS/MS SCAN METHODS FOR A QUADRUPOLE/TIME OF FLIGHT TANDEM MASS SPECTROMETER

CROSS-REFERENCE TO RELATED APPLICATION

This application is a Continuation-in-Part of earlier application Ser. No. 09/316,388 filed May 21, 1999 now U.S. Pat. No. 6,285,027.

FIELD OF THE INVENTION

This invention relates to mass spectrometry including multiple mass analysis (MS/MS) steps and final analysis in a time of flight (TOF) device or in general any orthogonal mass spectrometry system. This invention is more particularly concerned with such a technique carried out in a hybrid tandem quadrupole-TOF (QqTOF) spectrometer and is concerned with improving the duty cycle of such an instrument for parent or precursor ion scanning and like operations, or more generally to improving the duty cycle over a wide mass range for any type of scan.

BACKGROUND OF THE INVENTION

Tandem mass spectrometry is widely used for trace analysis and for the determination of the structures of ions. In tandem mass spectrometry a first mass analyzer selects ions of one particular mass to charge ratio (or range of mass to charge ratios) from ions supplied by an ion source, the ions are fragmented and a second mass analyzer records the mass spectrum of the fragment ions. In a triple quadrupole mass spectrometer system, this effects MS/MS. Ions produced in an atmospheric pressure source, pass through a region of dry nitrogen and then pass through a small orifice into a region at a pressure of several torr. The ions then pass through, a quadrupole ion guide, operated a pressure of about 7×10 3 torr into a first quadrupole mass analyzer, operates at a pressure of about 2×10−5 torr. Precursor ions mass selected in the first quadrupole mass analyzer are injected into a collision cell filled with an inert gas, such as argon, of a pressure of $10^{-4}$ to $10^{-2}$ torr. The collision cell contains a second quadrupole (or multipole) ion guide, to confine ions to the axis. Ions gain internal energy through collisions with gas and then fragment. The fragment ions and any undissociated precursor ions then pass into a third quadrupole, which forms a second mass analyzer, and then to a detector, where the mass spectrum is recorded.

Triple quadrupole systems are widely used for tandem mass spectrometry. One limitation is that recording a fragment mass spectrum can be time consuming because the second mass analyzer must step through many masses to record a complete spectrum. As in any scanning mass analyzer, all other ions (outside of 'transmission window') are lost for analysis, thus reducing the duty cycle to values of around 0.1% or less. To overcome these limitations, QqTOF systems have been developed (as described for example in: Morris, H. R.; Pacton, T; Dell, A.; Langhorne, J.; Berg. M.; Bordoli, R. S.; Hoyes, J.; Bateman, R. H.; *Rapid Commun. Mass Spectrometry,* 1996, 10, 889–896; and Shevohenko, A.; Chernushevich, I.; Ens, W.; Standing, K. G.; Thomson, B.; Wilm, M.; Mann, M., *Rapid Commun. Mass Spectrometry,* 1997, 11, 1015–1024). This system is similar to the triple quadrupole system but the second mass analyzer is replaced by a time-of-flight mass analyzer, TOF. The advantage of the TOF is that it can record $10^4$ or more complete mass spectra in one second without scanning. Thus for applications where a complete mass spetrum of fragment ions is desired the duty cycle is greatly improved with a TOF mass analyzer and spectra can be acquired more quickly. Alternatively for a given measurement time, spectra can be acquired on a smaller amount of sample.

A further known technique is the coupling of electrospray ionization (ESI) to time-of-flight mass spectrometers (TOFMS), and this is an attractive technique for mass spectrometry. ESI is a soft ionization technique capable of forming ions from a broad range of biomolecules, while TOFMS has the well known advantages of rapid mass scanning, high sensitivity, and a theoretically limitless mass range. However, ESI and TOFMS are, in one way, incompatible as a source/analyzer pair: ESI creates a continuous stream of ions and TOFMS requires pulsed operation. Thus in the simplest coupling of ESI to TOFMS there is a very poor duty cycle, with less than 1% of the ions formed being detected (to obtain reasonable mass resolution) and early work in this field was predominantly concerned with increasing the duty cycle.

Within the past two years, literature on ESI-TOFMS has begun to focus on tandem mass spectrometry (MS/MS) with hybrid instruments. The fragmentation of ions in these systems is achieved via traditional methods for collision induced dissociation (CID), Tandem-in-space systems termed quadrupole-TOF's (QqTOF of QTOF), as noted above, are analogous to triple quadrupole mass spectrometers—the precursor ion is selected in a quadrupole mass fitter, dissociated in a radiofrequency- (RF-) only multipole collision cell, and the resultant fragments are analyzed in a TOFMS. Tandem-in-time systems use a 3-D Ion trap mass spectrometer (ITMS) for selecting and fragmenting the precursor ion, but pulse the fragment ions out of the trap and into a TOFMS for mass analysis.

Tandem mass spectrometers (in particular, triple quadrapoles and QqTOFs) are often used to perform a technique known as a parent ion scan (or precursor ion scan). In this techniques the first mass resolving quadrupole is scanned in order to sequentially transmit precursor ions over a selected mass range. The second mass spectrometer is used to selectively transmit only one specific fragment or product ion from the collision cell. The mass spectrum thus produce by scanning, the first mass spectrometer shows only those ions from the ion source which fragment to produce the specific product ion. Thus from a complex mixture of ionized species, a simple mass spectrum allowing only those components which produce the known fragment ion is produced. This method is often used in order to identify precursor ions as candidates for fill MS/MS. For example, if the sample contains a mixture of many different species, and the only compounds of interest are those which have a structure known to always generate a fragment of m/z 86, then a precursor ion scan may be performed in order to identify which precursor ions form m/z 86. A full MS/MS spectrum may then be performed on those few precursor ions, instead of on every peak in the Q1 mass spectrum. In this way, a significant amount of time can be saved in analyzing the sample.

In triple quadrapoles, precursor ion scans have proved to be the right tool to search for ions of certain classes of compounds, e.g. peptides[1], glycopeptides[2] or phosphopeptides[3] (as detailed, for example in the following references for these three classes of compounds, [1]M Wilm, G. Neubauer and M. Mann, *Anal. Chem.,* 1996 88, pp. 527–633; [2]S. A. Carr, M. J. Huddleston and M. F. Bean, *Protein Science,* 1993, 2, pp.183–198; [3]S. A. Carr, M. J. Huddleston and R. S. Annan, *Anal. Biochem.,* 1996, 239, pp 180–192). However, a current limitation of the Qq-TOFs is their lower sensitivity in this particular mode of operation, compared to triple quadrupoles. The last mass analyzer (TOF or Q3) does not need to scan in this mode, and the Qq-TOF does not benefit from simultaneous ion detection in TOF. On the other hand, more ions are lost in a TOF compared to a third quadrupole: at the entrance, on grids, and mostly due to duty cycle.

The problem here is that usually the fragment ions cover a large m/z range, and the TOF instrument has to capture all that m/z range if consecutive spectra are not to overlap. If one is interested in just a particular mass, then this can lead to a low duty cycle.

There are two main factors governing the duty cycle of an orthogonal acceleration TOF instrument when operated in the conventional (continuous beam) mode. Generally, you have to wait for the heaviest ions to reach the detector before the next pulse of ions can be introduced. Since the width of the entrance window is only a traction of the transverse distance between the ion storage region and the detector, even the heaviest ions will overfill this region before the next pulse of ions can be released. The loss due to this effect is simply equal to the ratio of the length of the entrance window to the distance between the storage region and the detector. This ratio is often 1:4, giving a maximum duty cycle of 25% (achievable only for the heaviest ions).

Additionally, there is a loss factor due to the mass-dependent velocities of the ions. This is due to the fact that ions have a constant transverse energy; which means that the velocities of the lighter ions are higher than those of heavier ions (in the ratio of the square root of the ratio of the masses). This means that the duty cycle loss of lighter ions is larger than that of the heaviest ions in the spectrum, that is the lighter ions tend to overfill the ion storage region to an even greater extent than the heavier ions. For example, if ions of up to m/z 2000 are present, and one is particularly interested only in m/z 200, then the additional loss factor is:

$$\sqrt{\frac{200}{2000}} = \sqrt{0.1} = 0.316$$

Putting together the loss factor for the heaviest ions, plus the additional loss factor for lighter ions, gives for m/z 200 a total duty cycle of approximately 31.8% time 26%, which is approximately equal to 8%. The equation which describes the theoretical efficiency for m/z $m_1$ is therefore:

$$\text{Transmission efficiency}=0.25^{*}\sqrt{(m/M)} \qquad (1)$$

where M=heaviest ions which can reach the detector within the time period of one pulse (i.e within a time equal to 1/f, wherein f is the frequency of the TOF pulse).

It has been known to provide ion traps in a TOF mass spectrometer (although not in a QqTOF type of arrangement, using the collision cell as the ion trap). Thus, U.S. Pat. No. 5,689,111 (Dresch et al and assigned to Analytica of Brantford) describes an instrument which provides a linear two-dimensional ion guide with a time of flight m/z analyzer. The ion guide is a multipole ion guide. However, while the intention is to improve the duty cycle, a single ion guide is provided extending through two different on chambers. An ion entrance section of the ion guide is located in a region where background gas pressure is in the viscous flow regime and the pressure along the ion guide drops to molecular flow pressure regime, at the ion exit section. The ion guide is switched to operate as an ion trap. However, this is not a tandem instrument in that there is only a single multipole ion guide. Thus, this instrument can only detect ions in a certain mass range, and does not have the ability to provide an upstream mass resolving section to select ions of interest. There is no recognition that this method can he applied to enhance the sensitivity of an MS/MS device where ions are coming out of a collision cell. Nor is there any indication that it can be used to enhance sensitivity in any situation where one or more specific ions (fragments or precursors) are desired to be monitored. Specifically, there is no indication that the method can be used to enhance the sensitivity in a precursor ion scan mode, MRM mode, or neutral loss scan mode.

Another proposal is found in U.S. Pat. No. 5,763,878. This discloses a method and device for orthogonal injection into a time of flight mass spectrometer. It provides a somewhat unusual arrangement in which the multipole rod set extends through to the time of flight instrument. Ions are then pulsed out from one of the rod sets into the field free drift region of the time of flight instrument. However, again, there is no provision of an upstream mass resolving section. Also, both these patents do not discuss or mention a precursor ion scanning technique, and do not mention any MS/MS scanning methods.

SUMMARY OF THE INVENTION

It is now, being realized that providing an ion trap in a QqTOF can lead to considerable improvement in the duty cycle of the overall instrument, for those types of scan where a relatively narrow m/z range needs to be recorded by the TOF analyzer, in particular: precursor ion scan, "neutral loss" scan, and "multiple reaction monitoring" (MRM) scan, which is sometimes referred to as "selected reaction monitoring" (SRM) scan. It has also been realized that the technique detailed below cart be used to provide a considerable improvement in the duty cycle over a wide mass range by, in effect, applying the method of the present invention to a series of narrow mass ranges.

In accordance with the present invention, there is provided a method of effecting mass analysis on an ion stream, the method comprising:

(1) providing a stream of ions having different mass to charge ratios;

(2) trapping the ions in an ion trap;

(3) periodically releasing, from the trapped ions, ion pulses into a mass analyzer, to detect ions with a second mass to charge ratio; and (4) providing a delay between the release of the ion pulses and initiation of mass analysis in the mass analyzer, and adjusting the delay to improve the duty cycle efficiency in the mass analyzer for ions with a desired mass to charge ratio.

The method preferably include effecting mass analysis in a time of flight instrument provided as said mass analyzer, and adjusting the duration of each ion pulse to improve the duty cycle efficiency of ions with the desired mass to charge ratio. More preferably, the delay of step (4) comprises providing a time delay between each ion pulse and initiation of a drive pulse in the time of flight instrument, and adjusting the duration of each ion pulse and the time delay to improve the duty cycle for a range of ion mass to charge values, including the desired mass to charge ratio.

For a wide range of mass to charge ratios, the mass analysis or step (4) comprises mass analyzing ions in a relatively broad range mass to charge ratios, the method including: enhancing the sensitivity for different ion mass to charge ratios by providing a series of intervals, during each of which the ion pulse duration and the time delay are optimized for a relatively narrow range of mass to charge values, and setting the narrow ranges of mass to charge ratios to cover together all of the broad range of mass to charge ratios, whereby substantially all ions in the broad range of mass to charge ratios are given an improved duty cycle.

For a variety of MS/MS techniques, the method includes:

a) passing the ion stream through a mass analyzer to select a precursor ion with a desired mass to charge ratio;

(b) subjecting the precursor ions to at least one of the collision-induced dissociation and reaction to generate product ions; and (c) passing the product ions into the ion trap to effect step (3).

BRIEF DESCRIPTION OF THE DRAWING FIGURES

For a better understanding of the present invention and to show more clearly how it may be carried into effect, reference will now be made, by way of example, to the accompanying drawings which show a preferred embodiment of the present invention and in which;

FIG. 1 is a schematic of a QqTOF instrument;

FIG. 2*a* is a detailed schematic of the collision cell and pulser section at the TOF at FIG. 1;

FIG. 2*b* is a diagram showing variation of the DC potential in the collision cell;

FIG. 2*c* is a timing diagram for pulses for the QqTOF of FIG. 2*a;*

FIGS. 3*a*–3*d* are graphs showing variation of sensitivity for different pulse delays for ejecting ions from an ion trap and showing comparison with no trapping, FIGS. 4*a* and 4*b* are graphs showing the relative performance for a precursor ion scan, with and without ion trapping;

FIGS. 5*a* and 5*b* are graphs showing the relative performance for an MRM scan, with and without ion trapping; and FIGS. 6*a*–6*d* are graphs showing variation of the flight time for different gate voltage profiles on the exit lens from the collision cell, with gate voltage profiles shown insert;

DESCRIPTION OF THE PREFERRED EMBODIMENT

Figure 1:
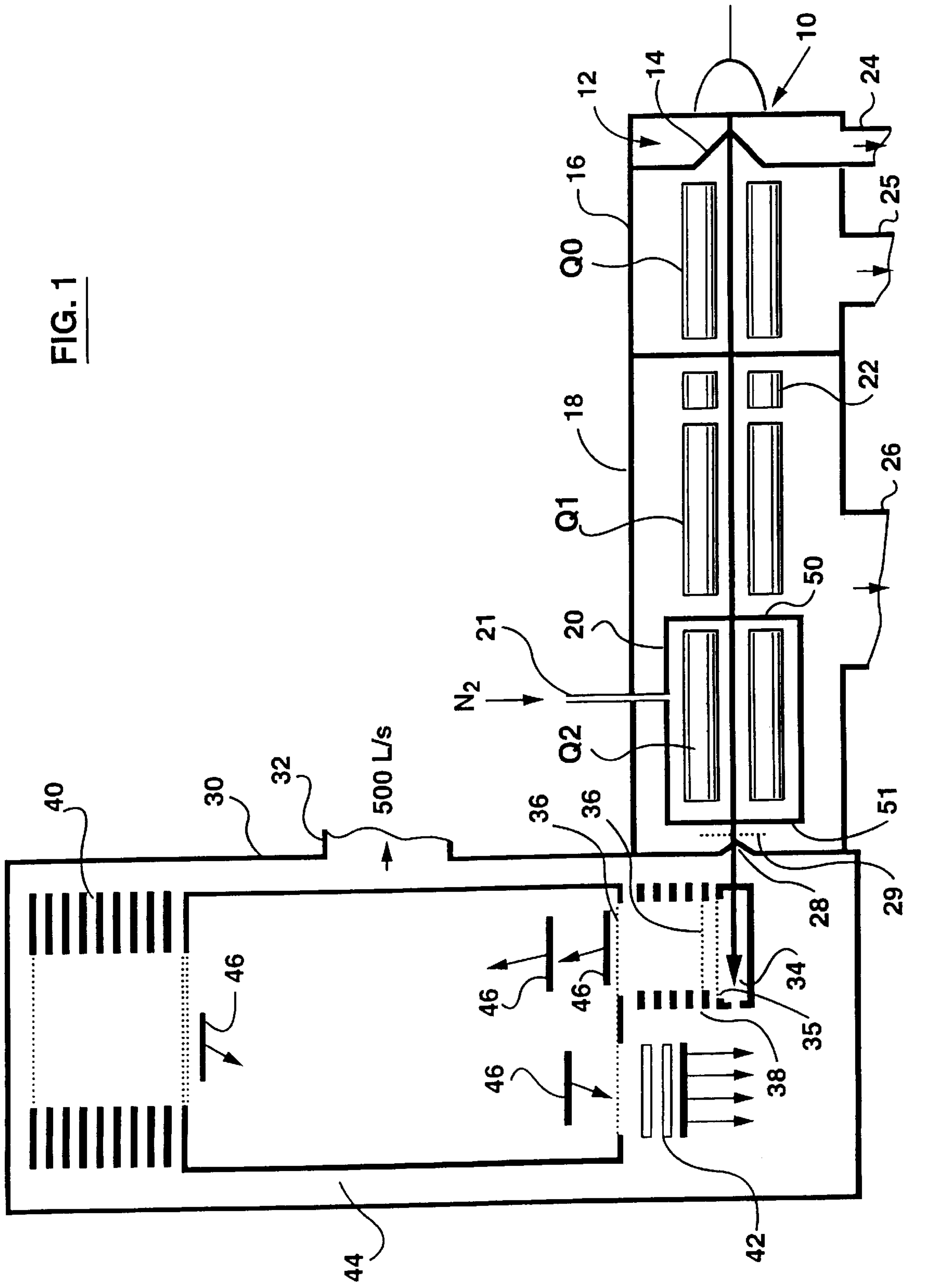

Referring first to FIG. 1 there is shown a QqTOF instrument, and the basic configuration of such an instrument is known.

This instrument includes an electrospray source 10, although it is understood that any suitable ion source can be provided. Ions pass through into a deferentially pumped region 12, maintained at a pressure of around 2.5 torr, and from there through a skimmer 14 into a first collimating quadrupole Q0 operated in RF-only mode. Q0 is located in a chamber 16 maintained at a pressure around $10^{-2}$ torr.

Downstream, there is a further chamber 18, containing two main rod sets Q1 and Q2, with Q2 being indicated within an interior, subsidiary chamber 20. Chamber 18 would be maintained at a low pressure of approximately $10^{-5}$ torr, while the subsidiary chamber 20 is supplied with nitrogen or argon gas as indicated at 21 for effecting CID. Chamber 20 would be typically maintained at a pressure of around $10^{-2}$ torr.

Upstream from the rod set Q1 is a short collimating rod set 22. The rod set Q1 is operated in a mass resolving mode, to select ions with a particular m/z ratio. These ions then pass through into Q2 and are subject to collision-induced dissociation (CID) and/or reaction. Then, the product ions, and any remaining precursor ions pass through into the TOF instrument indicated generally at 30.

It is to be noted that the various chambers of the device are, in known manner, connected to suitable pumps, with pump connections being indicated at 24, 25, 26 and, for the TOF instrument at 32. Commonly, the differentially pumped region 12 would be connected to a roughing pump, which would serve to back up higher performance pumps connected to the pump connections 25, 26 and 32.

As the ions leave the chamber 20, they pass through a focusing grid 27 and then pass through a slit having dimensions of 2 mm times 8 mm into the TOF 30.

Within the TOF 30, there is an ion storage zone 34 and window 35. Grids 36 are provided in known manner for effecting a push-pull pulse to one collected in the ion storage zone 34. An accelerating column is indicated at 38.

At the far end of the TOF instrument, there is an ion mirror 40 and a detector is provided at 42. In known manner, the main chamber or flight tube of the TOF is defined by a liner 44.

Ions leaving the ion storage window 34 are accelerated towards the ion mirror 40 and then back towards the detector 42. The ions still have a transverse velocity (resulting from their travel through the quadrupole rod sets Q0, Q1 and Q2), which means that they return to the detector 42. Clouds of ions are indicated schematically at 46, showing how ions travel through the TOF instrument 40.

Now, in accordance with the present invention, the chamber 20 around the quadrupole Q2 is provided with lenses 50 and 51 at either end so that it can be operated as an ion trap.

Figure 2A:
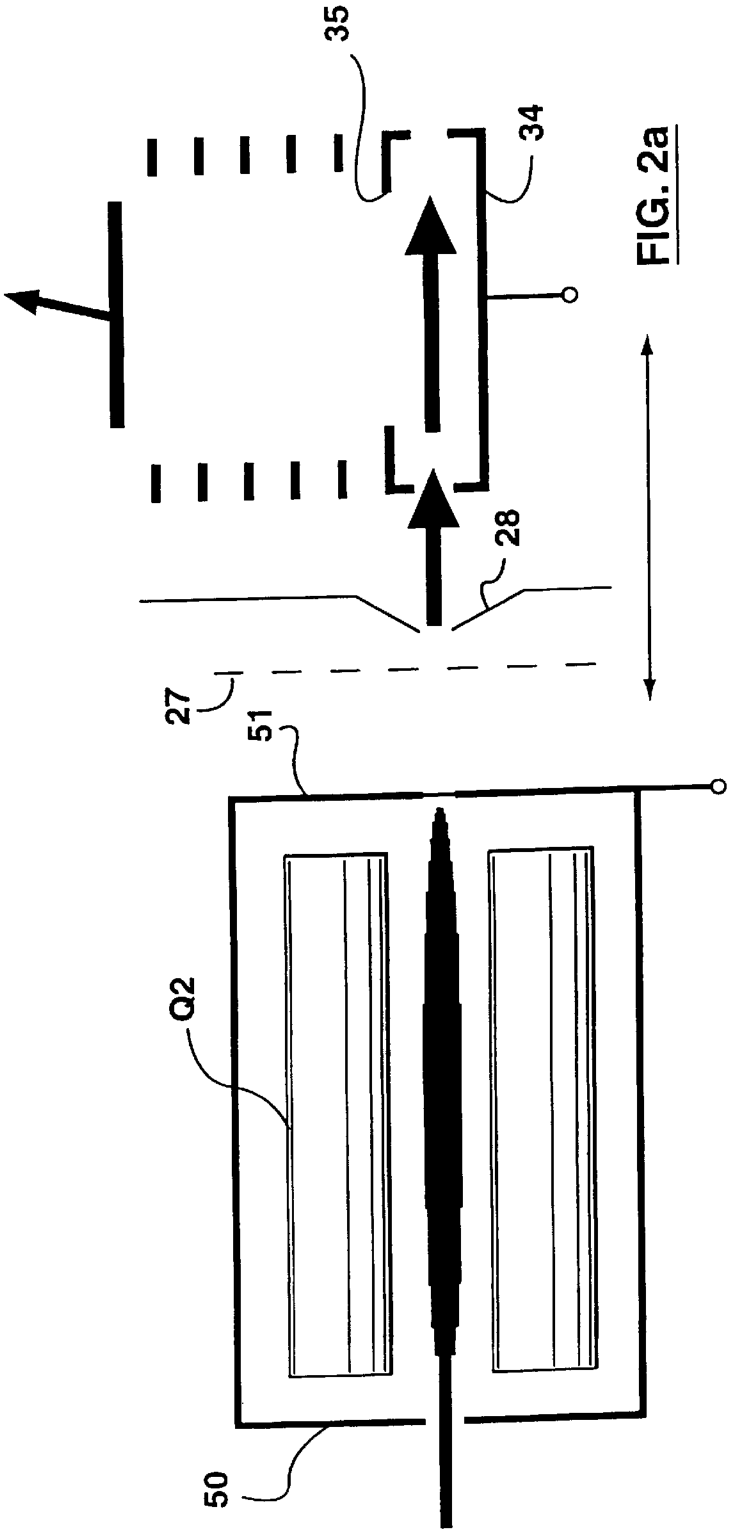
Figure 2B:
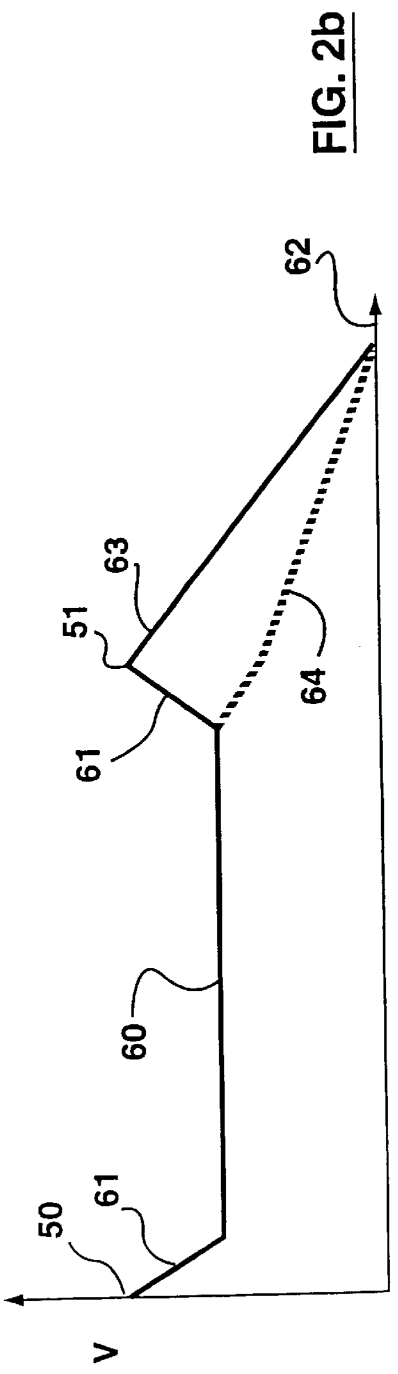
Figure 2C:
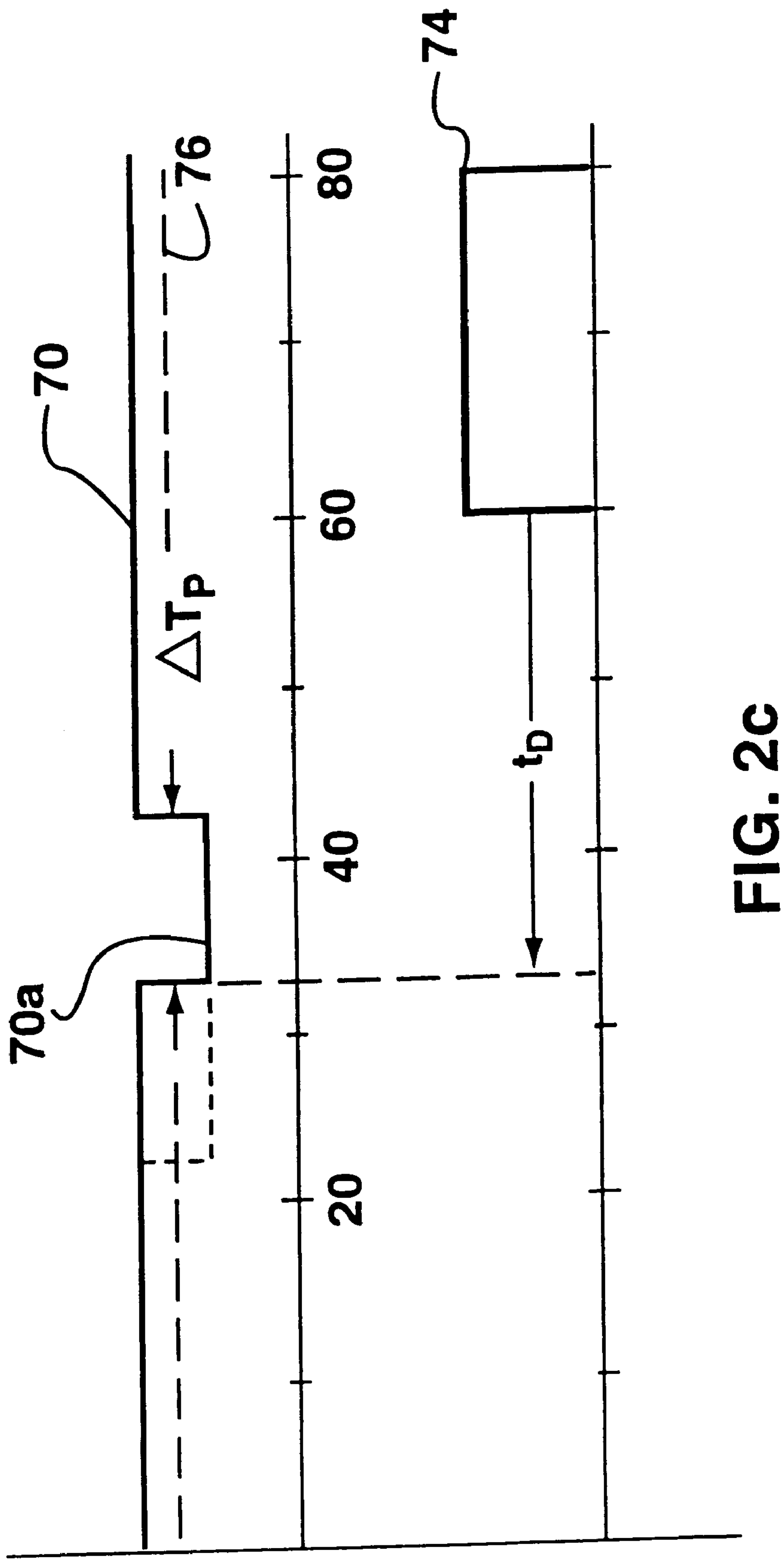

Reference will now be made to FIGS. 2*a*, 2*b* and 2*c* to explain the effect of trapping ions in Q2 on the instrument's duty cycle. FIG. 2*a* shows Q2, the chamber 20 And the lenses 50, 51, the grid 27, the slit 28 and the ion storage zone 34 with a window 35. FIG. 2*b* shows the plot of voltage along the axis of Q2, and FIG. 2*c* shows the timing of the voltages applied to the lens 61 and storage zone 34.

FIG. 2*b* shows the variation of the DC potential along the axis of the rod set Q2. The DC potential at Lie rod set Q2 is indicated at 60, and at 61 the potential gradients at either end up to the potential of lenses 50, 51 are indicated. The potential at the slit is indicated at 62 (in this case, the slit and the storage zone 34 are at ground potential). Line 63 (top line) shows the profile of the potential when ions are trapped in Q2, and Line 64 shows the profile of the potential when the voltage on exit lens 51 is dropped in order to release a pulse of ions. The exact form of this gradient can be modified by changing the potential on grid 27, which is between lens 51 and slit 28. Thus, in effect, through the chamber 20, the ions then see either a constant DC potential, or a gradient accelerating the ions towards the storage region 34.

In FIG. 2*c*, 70 shows the variation of potential on the exit lens 51 with time. For comparison purposes, for the lens 51, the dashed line 76 indicates the DC potential of the rod set Q2 correspondingly. Line 74 shows the variation of potential of the conventional push-pull arrangement at the ion collection zone 34.

During the trapping period (lens 51 at "high" voltage, typically 2V above the potential 76 of the rod set Q2), ions enter collision cell Q2 easily, but cannot leave it in either axial direction because of the potential barrier present on both entrance and exit lenses 50 and 51. This is true even if ions have a significant amount of energy upon entering Q2, since most of this energy will be lost due to collisions with gas in Q2, resulting in both fragmentation and collisional damping of ions, and possibly reaction with the gas.

When it is desired to eject a pulse of ions, the voltage on the lens 51 is switched to "low", (as shown at 64 in FIG. 2*b*) which is lower than the potential of the rod set 76, This "low" voltage is applied for the time ΔTp, a pulse duration. Typically, the "high" voltage is a few volts higher, and the "low" voltage is a few volts lower that the rod set voltage 76.

A cloud of ions then leaves the ion trap. After time ΔTp when some, but not necessarily all of the ions have left the ion trap, the voltage on the lens 51 goes to "high" again. The time between pulses (typically 100–200 μs) is much smaller than a characteristic time of scanning Q1 (dwell time), typically 1 10 ms, so it is not critical if some ions remain in the trap of Q2, as these can be included in the next pulse. This has a dual effect: It starts trapping in Q2 again; and it may also have the effect of accelerating the rearmost portion of the elongated ion cloud towards the TOF device and causing the ions to bunch up. This is a desirable effect, as it helps to produce a shorter (in the direction of flight) ion cloud. While trapping itself doesn't depend on the particular values of "high" and "low" voltages, the "bunching" effect depends strongly on these voltages, and they should be adjusted properly, this is detailed below. Generally, ΔTp is calculated from the velocity of ions of interest and the length of the storage zone 34, so that the cloud of ions is short enough not to overfill the storage zone 34, so as to make best use of the ions.

Figure 7:
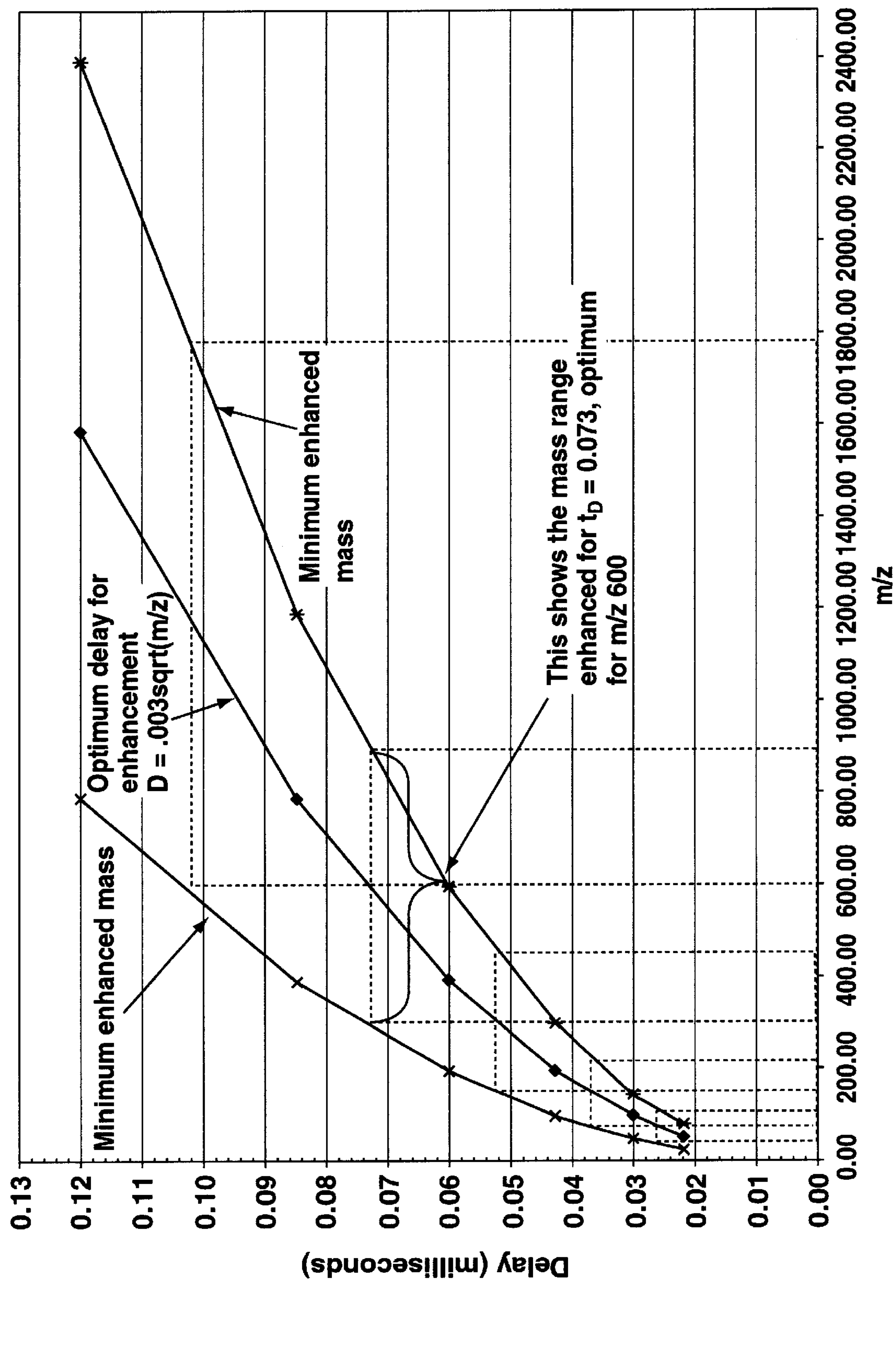
FIG. 7 shows graphically how enhancement ranges or intervals are determined in order to cover a wide range of mass to charge ratios.

The ion cloud then passes through the slit 28 and into the ion storage zone 34. After a time delay period $T_D$, as indicated in FIG. 7, the appropriate push-pull voltages, indicated at 74, are applied, to accelerate the ions into the TOF device, for measurement in known manner.

The time delay $t_D$ is selected in such a way so as to maximize transmission of ions in the m/z-range of interest. Since all ions are accelerated with same electric fields from lens 51 to the storage zone 34, they obtain same kinetic energy in this region, but their velocity depends on their mass. Thus, this region serves as another small TOF analyzer where a rather crude separation of ions happens.

The ion transmission is maximized for those ions which at the time of push-pull pulse happen to be in the storage zone 34 exactly under the window 35. For those ions a 100% duty cycle will be achieved. So, the optimal delay time $t_D$ is selected to allow ions of interest to move from Q2 to the storage zone 34 and generally centered under the window 35.

The delay time $t_D$ is proportional to $\sqrt{m/z}$. Since the flight time through the main TOF device is also proportional to the same value, the optimal delay time can be found as a certain ratio of the flight time measured in the TOF device. In our instrument, these times were found to be roughly equal.

Now, for m/z=86, the flight time through the TOF device is 26 μs, while the optimal delay time $t_D$ was found to be 22 μs. i.e. approximately equal as indicated. This ion, with m/z=86, is of particular interest in some applications since it is an ammonium ion of most abundant amino acid residues leucine and isoleucine, and it is widely used in "precursor ion scanning" in order to distinguish peptide ions from ions of other compounds.

Based on the dimensions of the instrument used, the average time for the ions to travel from the ion trap to the ion collection zone 34 is 17.5 μs. For this the calculated pulse width ΔTp should be approximately 6.5 μs. The fact that the actual optimum values found (20 μs pulse width and 22 μs time delay) for m/z 86 are different from the calculated values, may be due to the additional time which is required for ions to travel from inside the collision cell to life exit lens 51.

It is to be appreciated that the invention can also be used to effect a neutral loss scan. In such a scan, the intention is to measure ions having a constant mass difference from ions selected in Q1, with the same charge. For example, if ions with an m/z of 1,000 are selected in Q1, then the TOF 31 could look for ions with an m/z of 800; in other words, one is looking for a neutral mass loss of 200 daltons with both ions being singly charged. A neutral loss scan of 200 would require scanning the quadrupole, while trapping in the collision coil and adjusting the time delay to provide optimum efficiency for product inns which were 200 daltons lower in m/z than the precursor ion.

Figure 3A:
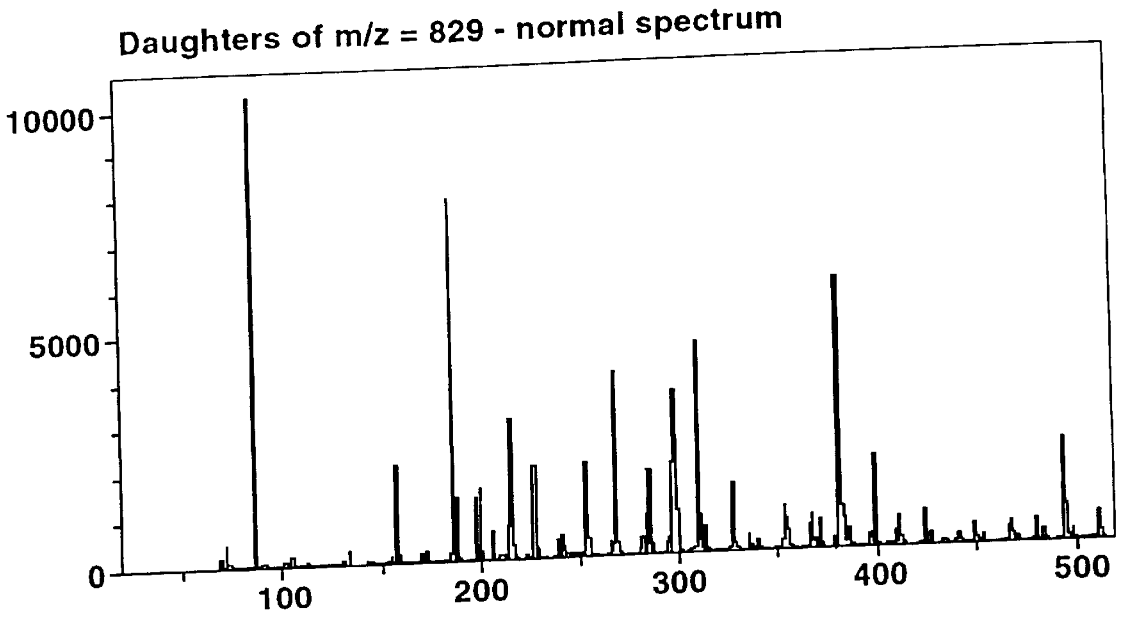
Figure 3B:
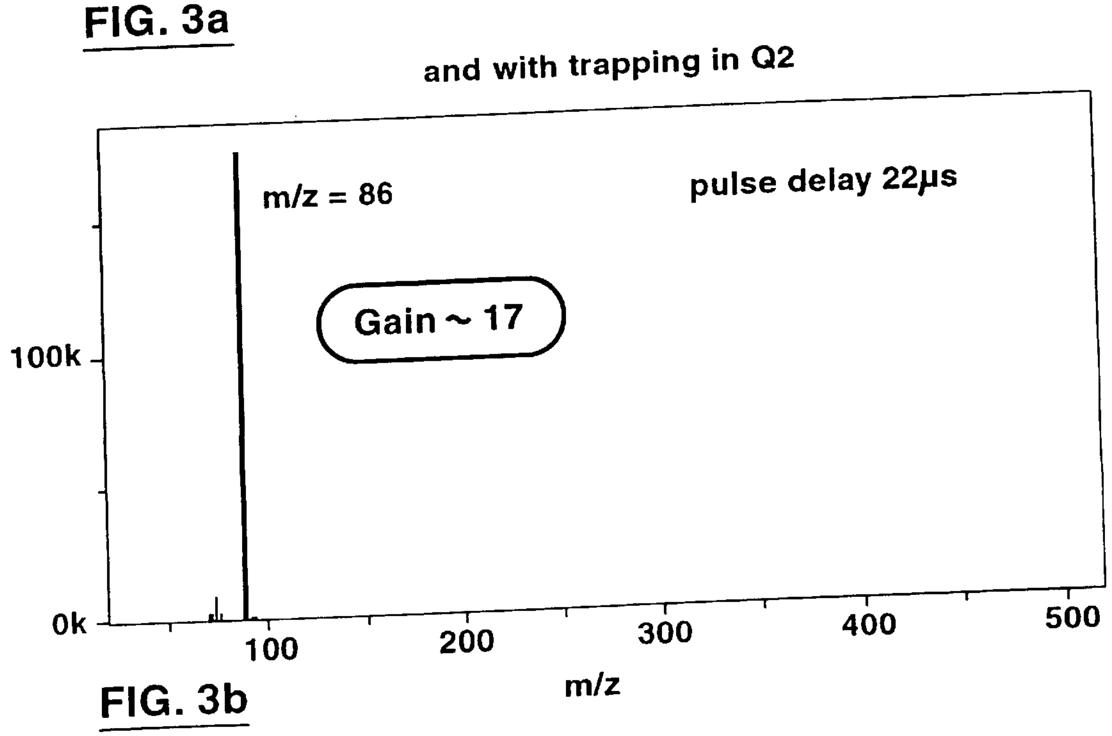

Reference will now be made to FIGS. 3*a* and 3*b*, which show a is series of tests carried out using a peptide, commonly identified as ALILTLVS, to generate the ions. This peptide has an m/z of 829. It was passed into Q2, trapped and fragmented and the product ions scanned in the TOF instrument or device 30. FIGS. 3*a* and 3*b* show two variants of this test; in FIG. 3*a* no trapping was carried out, and the product ions where passed straight through to the TOF instrument 30, and in FIG. 3*b*, trapping was cared out with a time delay $t_D$ 22 μs.

As shown in FIG. 3*a*, the total count for the m/z 86 was around 10,000, and there was a significant signal detected in the range of approximately m/z 200–500 In FIG. 3*b*, on the other hand, the count for m/z 88 show, a gain of approximately 17. Noticeably, the signal for ions of higher m/z is largely absent. This is due to the coarse or rough mass selection which occurs when ions are released from the ion trap to the ion collection window 34.

Figure 3C:
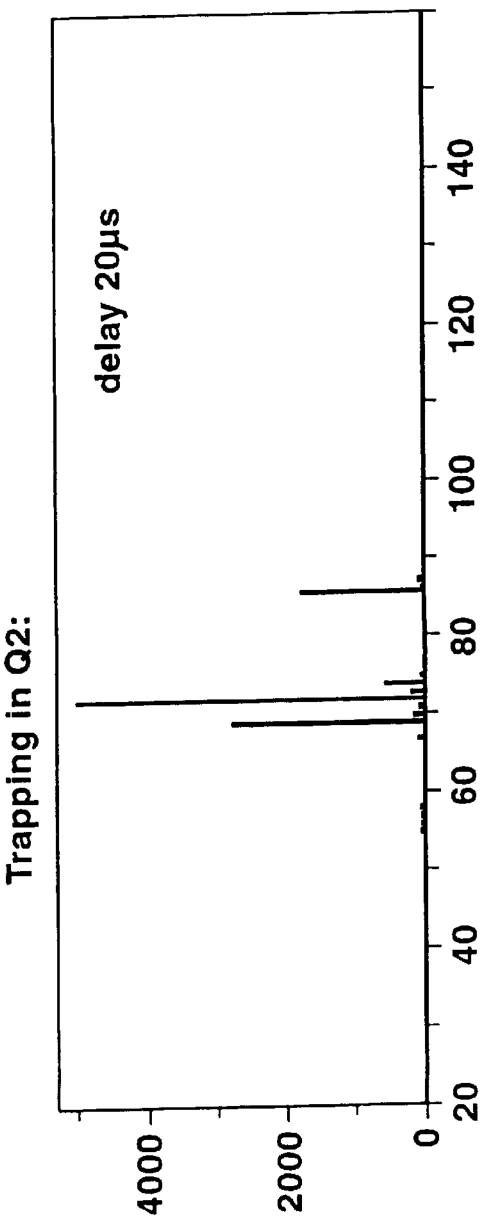
Figure 3D:
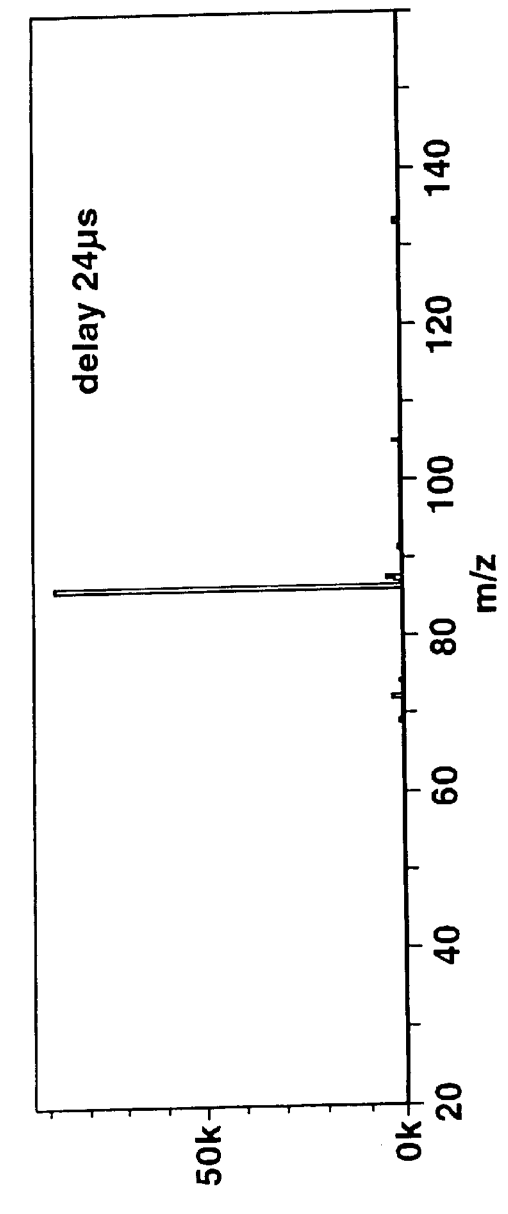

This is emphasized further in FIGS. 3*c* and 3*d*. These two figures show respective delays of 20 and 24 μs. As might be expected, the shorter delay of $t_D$=20 μs, is not quite long enough for ions of m/z=86 to reach the ion collection zone 34. In fact, this shows a reduced signal even as compared to the untrapped signal of FIG. 3*a*. Relatively high counts are recorded in the range 60–80 m/s.

In contrast, in FIG. 3*d*, a relatively strong signal is recorded, for $t_D$=24 μs, but the performance is not as good as in FIG. 3*b*. This series of figures clearly indicates that setting of the appropriate time delay $t_D$ is critical to obtaining high sensitivity and a strong signal for the mass of interest.

Figure 4A:
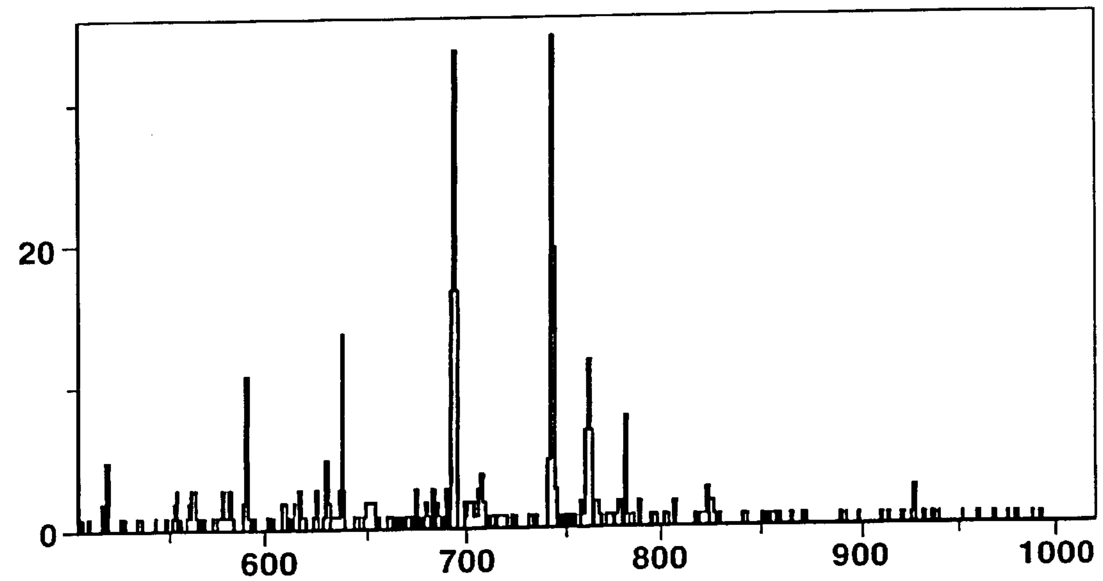
Figure 4B:
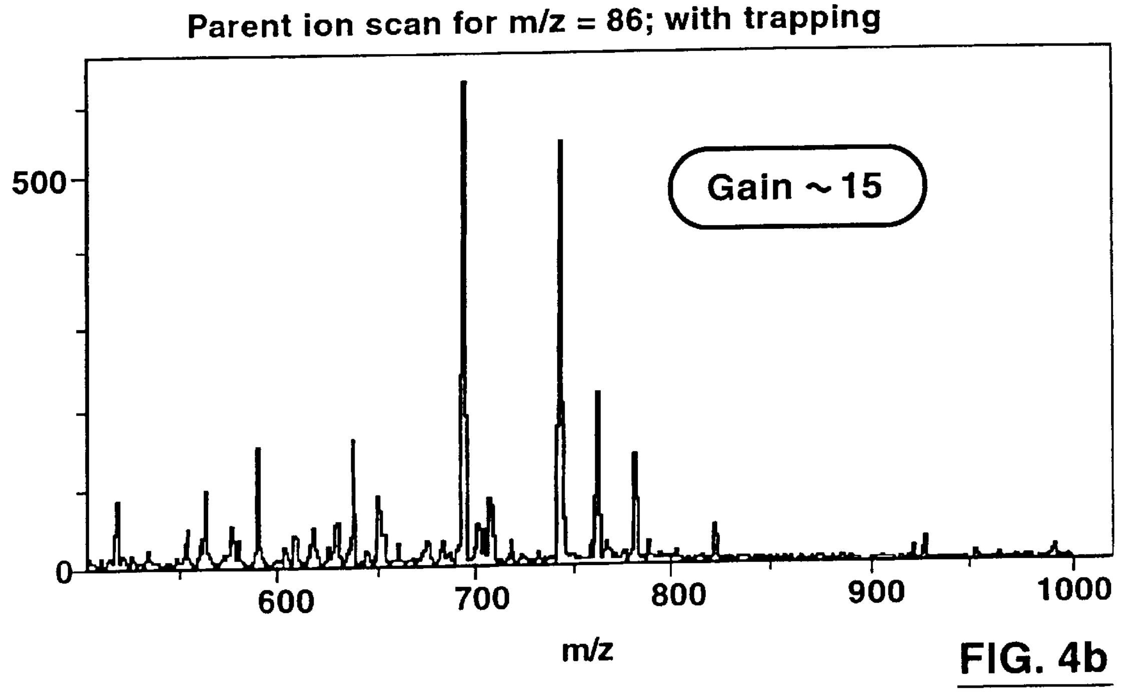

Turning now to FIGS. 4*a* and 4*b*, these show a precursor ion scan for a tryptic digest of myoglobin, i.e. myoglobin digested by an enzyme to give a variety of peptides. Here, the vertical axis again indicates the number of counts for m/z 86 as detected in the TOF instrument 30. The horizontal axis shows the variation of m/z of the precursor ion, as scanned in Q1.

Thus, FIG. 4*a* shows two significant peaks for an m/z of the precursor ion of somewhere just below 700 and at approximately 740, as giving strong signals for m/z 86 detected in the TOF instrument 30.

A comparison of FIG. 4*b* shows an approximate gain of 15 in the signal strength for the peaks detected, when trapping is carried out in Q2. Again, trapping here is carried nut with the delay $t_D$ determined from the results shown in FIG. 3, i.e. with $t_D$=22 μs. One can also note that relative diminution of small, background peaks in FIG. 4*b* as compared to FIG. 5*a*.

Figure 5A:
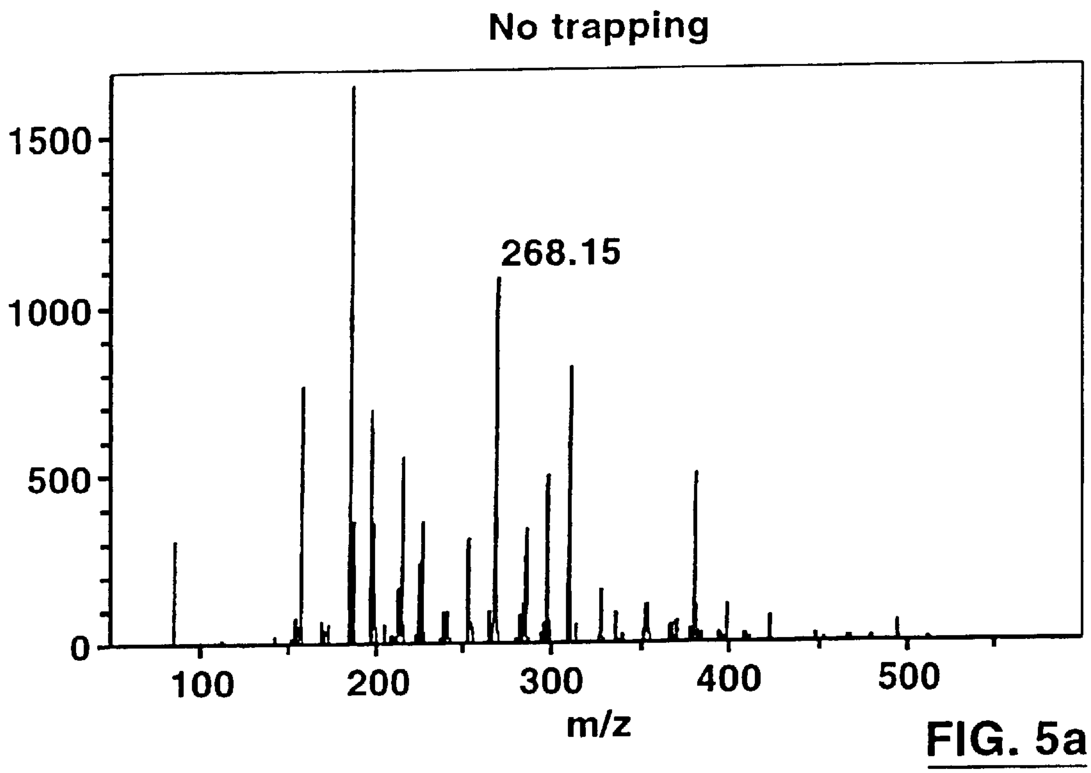
Figure 5B:
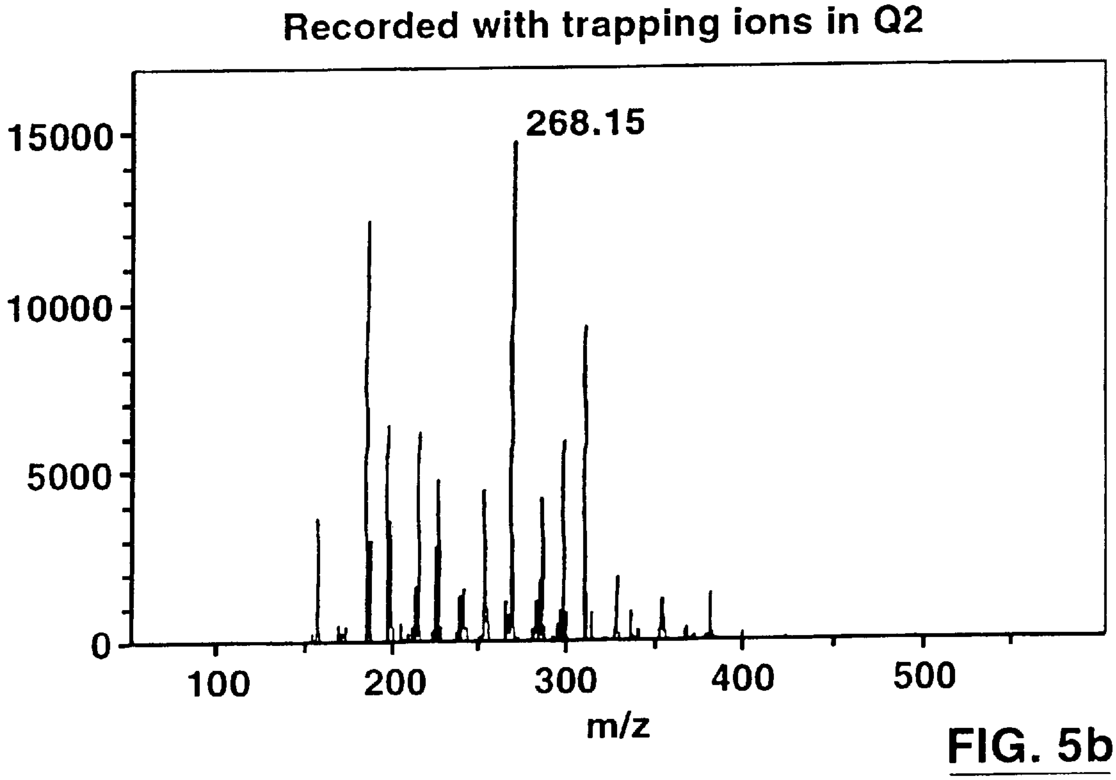

Turning to FIGS. 5*a* and 5*b*, these again show a comparison of results obtained without trapping and with trapping. Once again, the sample used was the peptide ALILTVS, which produces a precursor ion of m/z 829. The precursor m/z 829 was selected with Q1 and fragmented in the collision cell, and FIG. 5*a* shows the full MS/MS spectrum, which contains an ion of m/z 268.15. While It is prominent, it is not the highest peak, and it shows an intensity of approximately 1,100. This shows the effect of no trapping.

With trapping, and optimizing the time delay for m/z 268.15, one can see that this peak at m/z 268.15 is now the largest peak, and the total count has increased, by a factor of 13 to approximately 15,000. This indicates that the method can be used to optimize ions of different m/z.

The trapping method can be used advantageously to improve the performance of the MRM mode of analysis. The MRM mode is commonly used on triple quadrupoles to quantitatively measure the levels or amounts of targeted compounds, where the precursor and product ions are known. In triple quadrupoles, Q1 and Q0 are sequentially tuned to one or more precursor/product ion combinations. On the QqTOF, the trapping method can be used to improve the sensitivity for the targeted ions of interest, by setting Q1 to the precursor ion of interest and the time delay appropriate to the product ion of interest. After recording the ion intensity in the TOF for the product ion of interest for a time period of a few milliseconds, then Q1 and the time delay can be set to new values appropriate for another precursor/product combination. This provides enhanced sensitivity for the MRM mode, where several targeted ions can be monitored.

Referring now to FIGS. 6*a*–6*d*, these show the effect of variation in the voltages on the exit lens 51 and the duration ΔTp, of the voltage pulse on that exit lens. For convenience, each of these figures include some insert, indicating the voltage pulse profile, with reference 70, 70A and 76, as in FIG. 2*c*.

For the data collected at FIGS. 6*a*–6*d*, the peptide ALILTLVS is used It is fragmented upstream of Q0, by a separate technique. In Q1, m/z 86 was selected. Q2 was operated in a trapping mode only with no fragmentation. The TOF instrument 30 was operated in a DC mode, i.e. with no pulsing, so that the total flight time from Q2 to the TOF detector could be determined. Thus, the flight times shown in FIG. 6 are a total of the flight times from the lens 51 to the ion storage zone 34, and then from the ion storage zone 34 to the detector 42.

Figures 6A, 6B, 6C, 6D:
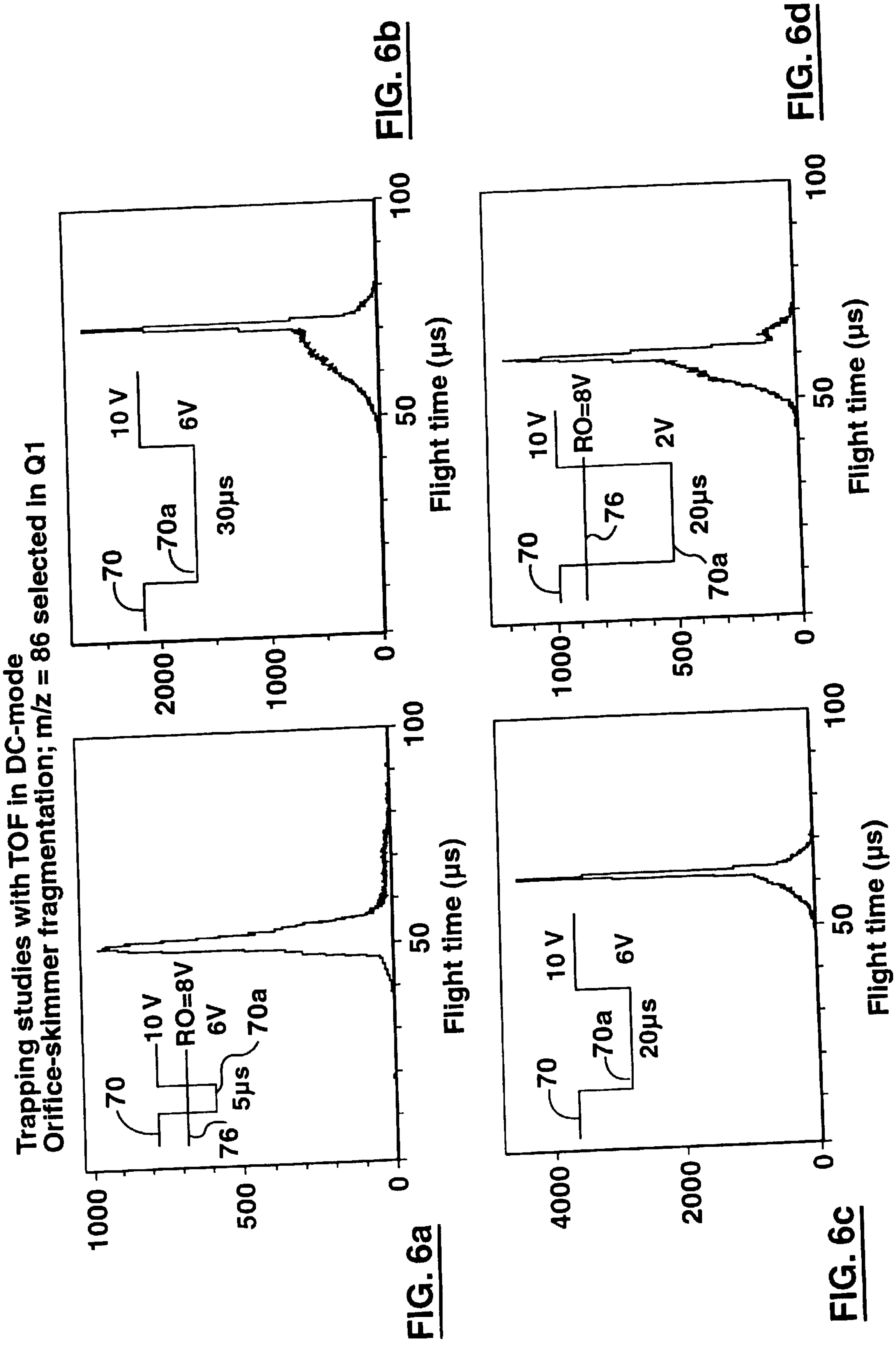

Referring first to FIG. 6*a*, this shows that the voltage on lens 51 was initially 10 volts, that is 2 volts above the DC rod potential of 76. For a pulse period of 5 μs, as indicated at 70A, this voltage is reduced to 6 volts. This gave the peak profile shown.

FIG. 6*b* shows a pulse with similar high and low voltage characteristics, but with a much longer duration of 30 μs. As might be expected, this shows a considerable width to the base of the peak. This indicates that there is an initial burst of ions leaving the rod set Q2, and then remaining ions are released more slowly.

FIG. 6*c* shows the same voltage characteristics, but for an intermediate duration ΔTp of 20 μs. This shows a much improved peak shape. The peak shows a higher maximum, and less spreading FIG. 6*d* shows an alternative pulse profile, for comparison purposes. Here, the duration ΔTp again was 20 μs, but when the gate 51 was opened, its voltage was reduced to 2 volts, i.e. 6 volts below the DC potential of the rod set Q2. It is believed that this large drop, and than the recovery at the end when the lens 51 is switched peak to 10 volts, gave an undesirably large acceleration to those ions which left the collision cell last. As a consequence, these ions, effectively arrived early, giving the expanded peak width on the left-hand side, showing ions arriving shortly after 50 μs. It seems clear that the time focusing properties exhibited in FIGS. 6*a*–6*d* are due to the process known as time-lag focusing.

It is clear from FIG. 6 that appropriate selection of the voltage magnitude and the pulse duration ΔTp can be helpful in obtaining a sharp peak shape, which can improve the definition of the mass window and provide better sensitivity.

It is clear from the description above that selection of appropriate values of the pulse width ΔTp and the pulse delay $t_D$ can provide very large increases in sensitivity for a specific mass (m/z) values, and also for a range of m/z values around the selected value. For example, in FIG. 5*b*, where these values are optimized to enhance the sensitivity of m/z 298.1, there are other peaks in the vicinity which are also enhanced. In fact the inventors have discovered that for the particular geometry of the QStar QqTOF system (manufactured by MDS inc., doing business as MDS Sciex)—when m/z M1 is enhanced, the, range over which enhancement occurs extends from approximately M½ up to 3M½, that is over a mass range which is approximately equal to the value of m/z which is enhanced. However, the degree of enhancement is not flat over that range of m/z values. The gains increase from about 1× at the value of M½, to a maximum at M1, and then fall gradually again to a value of 1× or less at a value of 3M½. These figures are approximate, and details of the shape of the enhanced region may depend on other factors such as lens voltages, ion energies etc. Additionally, the width of the enhanced region depends on the geometry of the instrument, in particular on the distance between the trapping region and the acceleration region of the TOF. However, what is clearly observed is that the width of the enhanced region increases as the value of the "center" enhanced m/x increases. Thus if ΔTp and $t_D$ and are selected to optimize the enhancement of m/z 86, then the range of m/z values observed (and enhanced by factors of more than 1) is very narrow. However, if the parameters are selected to optimize m/z 298.1, then the enhanced region is wider. If the parameters are selected to optimize m/z 600, then the enhanced region may extend approximately from m/z 300 up to m/z 900, although the enhancement factors at each end of the range will not be optimum.

This discovery suggests that the techniques can be used to enhance a wide range of m/z values if desired, instead of simply focusing on a single m/z value. For example, it is commonly required to obtain a Product Ion Scan over a wide mass range. In this mode of operation, a single precursor ion is selected with Q1, which is fixed at the m/z value of the precursor ion. The ions are fragmented in the collision cell (Q2), and the entire range of product ions is desired to be recorded in the TOF section. This mode is one of the most common modes of operation of a QqTOF System such as the QStar. In this case, it is desirable to enhance the sensitivity of a wide mass range equal to the expected mass range of all of the product ions. This range may extend from a low value such as m/z 50, up to at least the m/z of the precursor m/z, and if the precursor ion is doubly charged the desired range may extend up to a value of twice the m/z of the precursor ion. Those operating conditions are well known in the art.

Without application of the present invention technique, the desired Product Ion Scan is performed by selecting the Precursor ion m/z with Q1, fragmenting the selected ions; in Q2, and allowing all product ions to flow continuously into the TOF region, where they are pulsed orthogonally as described above, in order to product a TOF spectrum. Since no trapping is employed, ions of all m/z values can flow simultaneously into the TOF section. However, duty cycle losses as described above will be incurred, resulting in mass dependent transmission efficiency across the range of the mass window as described by Equation (1) above.

Now if it is desired to obtain a Product Ion Scan across a wide mass range, and it is desired to obtain the scan during a time T1 (for example, during a time of 1 second), then the time period T1 can be divided into two or more intervals, and during each interval a region of the TOF product ion spectrum can be acquired which is enhance over a certain range. By selecting the appropriate ranges of m/z values to be obtained, and setting the timing parameters to enhance each range during an interval of time, and then adding the resulting sections of the spectrum together, then a complete product ion spectrum, which is enhanced by some factor over the entire wide mass range, can be produced. Thus for example, if it is desired to obtain a product ion scan over a range from m/z 60 to m/z 500, the range can be broken into intervals of from m/z 60 to m/z 100, 100 to 300, and 300 to 500. By settings ΔTp and $t_D$ to values which enhance m/z values within the first range, and acquiring data for 0.33 second, then setting the parameters to to enhance the second range for 0.33 second, and then setting the parameters to enhance the third range for 0.33 seconds, and adding the resultant spectra together, a complete spectrum can be obtained in one second which is enhanced by some factor at all masses, although the enhancement factor will not be uniform over the entire range. By proper choice of ranges and timing parameters, a significant increase in sensitive can be achieved over a wide mass range in this way.

If the width of the mass range to be enhanced extends from M(Low) to M(High), then this range should be divided into n segments, The first segment, centered at m(1), has an enhanced range from in m (1)/2 up to 3*m(1)/2. The next mass range, centered at m(2) should start at 3*m(1)/2 and extend up to 3*m(2)/2. This pattern should be repeated until the entire mass range from M(Low) to M(High) is covered. A table of values of m/z values, delay and width values should be constructed as follows:

$$m(1) = (M(Low))^*2$$

$$m(2) = 3^*m(1)$$

$$m(3) = 3^*m(2)$$

$$m(4) = 3^*m(3)$$

$$\vdots$$

$$m(n) = 3^{n-1}m(1)$$

etc until 3*m(n)/2>M(High)

For each value of m(n): corresponding values of ΔTp and $t_D$ are calculated which ace optimum for each value of m(n). These values lay be calculated from previously calculated algorithms which can be used to predict the values of ΔTp and $t_D$, For example, for the geometry of the QStar QqTOF system, it has been discovered that the optimum values of ΔTp and $t_D$ are given approximately by;

ΔTp=0.0013*sqrt(m(n)) milliseconds $t_D$=0.003*sqrt(m(n))

Then for each value of m(n) calculated above, corresponding values of ΔTp and $t_D$ can be calculated. In order to enhance the range from M(Low) to M(High) the mass range is divided into n segments as described above, and the time is divided into n sub-intervals. During the first sub-interval, ΔTp and $t_D$ are set to those appropriate for m(1). For the second sub-interval, the values are set to those appropriate for m(2) etc up to m(n). By summing the mass spectra acquired during each sub-interval, an entire mass spectrum from M(Low) to M(High) is produced, and the intensity of the entire spectrum will be enhanced.

In addition to the parameters which control the timing of the trapping and releasing of ion pulses, it is also known that the ion signal intensity is also a function of the RF voltage level on the collision cell. For example, if low mass ions are to be stably trapped and confined in Q2, it is important that the RF voltage be set to a value which is optimum for the mass range of interest. When the RF voltage of the collision cell (Q2) is set to a value which is optimum for mass m(n), a range of m/z values is transmitted which extends from approximately 0.8m(n) up to at least 5m(n). For example, when the voltage is optimum for transmission of m/z 100, ions from m/z 80 up to approximately at least m/z 500 are also transmitted. The decrease at the high end of the range is rather gradual, so the boundary of 5m(n) Is only very approximate.

Nevertheless it is clear that in order to optimally transmit a wide range of productions, the RF voltage on Q2 may also need to be stepped sequentially through 2 or more values during each acquisition period, This is true even in the normal (prior art) mode of operation. For example, if it is desired to acquire a product ion spectrum from m/z 50 up to m/z 1000 during 1 second; it has been found necessary to set the Q2 RF interval to m/z 50 for 0.33 seconds, m/z 200 for 0.33 seconds and m/z 400 for 0.33 seconds. Note that this will give a degree of overlap, but this is desirable and there is a progressive drop off from the nominal center of each range, so as to ensure adequate capture of all masses. Spectra acquired during each interval are then added together. Since in order to perform the procedure described above, the acquisition period must be divided into segments in which different trapping parameters are applied, therefore it is advantageous to also set the Q2 RF voltage to a value which is optimum for each range of m/z values which are enhanced during the trapping. Therefore, for each set of trapping parameters which are applied, a different Q2 RF voltage is also set in order to provide the most optimum enhancement conditions The method of setting all of these parameters will be described below.

In the description above relating to TOF performance, the width of each mass range m(n), that gives an enhanced signal in the TOF section, is assumed to be approximately equal to the value of m(n). For example, it m(1)=200, then the range of enhanced m/z value is approximately equal to 200, extending from m/z 100 up to m/z 300. This recognition leads to the pattern described above, where $m(n)=3^{n-1}m(1)$, where m(1) is the center m/z value of the lowest range to be enhanced. However, it is also recognized that the enhancement values decrease toward each end of the range of width m(n). For this reason, In order to obtain maximum enhancement across a mass range, it may be better to divide the range into smaller segments (as suggested above for the RF level in Q2), such that each value $m(n)=2^{n-1}m(1)$. This will lead to narrower ranges, but each range will overlap somewhat with the adjacent ranges.

FIG. 7 shows graphically how the enhancement ranges are constructed, and how they overlap to provide a wide range of enhancement. Ranges are indicated at 81, 82, 83, 84 and 85 for the five different masses in Table 1 below. While division into a greater number of smaller ranges ensures that good overlap is achieved, and ensures that the average enhancement over any range is lamer, it also requires more steps, so that the time spent in each interval will be less. Therefore it is likely that there is an optimum degree of overlap to achieve maximum overall enhancement. The inventors have discovered that at least the suggested width of $m(n)=2^{n-1}m(1)$ works well, as will be shown below.

For each of the mass value m(n) into which the full range is divided, there is a corresponding value of the Q2 m/z value. Since the best transmission for any range is not centered on the mass value to which Q2 is set (as stated above, the ranges may extend from 0.8 m(n) up to 5m(n)), then a preferred method of setting the Q2 m/z value (defined as the m/z value which corresponds to a Matthieu q-parameter of 0.706) is as follows:

$$Q2(1) = M(Low) - 20$$
$$Q2(2) = m(2)/2 - 20$$
$$Q2(3) = m(3)/2 - 20$$
$$\vdots$$
$$Q2(n) = m(n)/2 - 20$$

As an example, assume that it is desired to enhance the range from 50 up 1000 amu. Then the values of m(n) are calculated as below:

$$m(1) = 1.5^{*}M(Low) = 1.5^{*}50 = 75$$
$$m(2) = 2^{2-1}m(1) = 150$$
$$m(3) = 2^{3-1}m(1) = 300$$
$$m(4) = 2^{4-1}m(1) = 600$$
$$m(5) = 3^{5-1}m(1) = 1200$$

The corresponding Q2 m/z, ΔTp and $t_D$ values are shown in the Table 1 below (where ΔTp and $t_D$ are in milliseconds and are calculated in accordance with the equations above):

| n | m(n) | Q2 | ΔTp | tD |
|---|---|---|---|---|
| 1 | 75 | 30 | .012 | .026 |
| 2 | 150 | 55 | .016 | .037 |
| 3 | 300 | 130 | .023 | .052 |
| 4 | 600 | 280 | .032 | .073 |
| 5 | 1200 | 580 | .045 | .103 |

Therefore, as shown, the entire mass range is divided into 5 segments, and the acquisition time for each spectrum (which may be typically of the order of 1 second) is divided into 5 intervals, of 0.2 seconds each. During the first 0.2 seconds, the width and delay parameters are set to 0.012 and 0.026 milliseconds respectively. During the next two seconds, the width and delay are set to 0.016 and 0.037 milliseconds respectively, etc. At the end of the fifth interval, the cycle is repeated.

Figure 8:
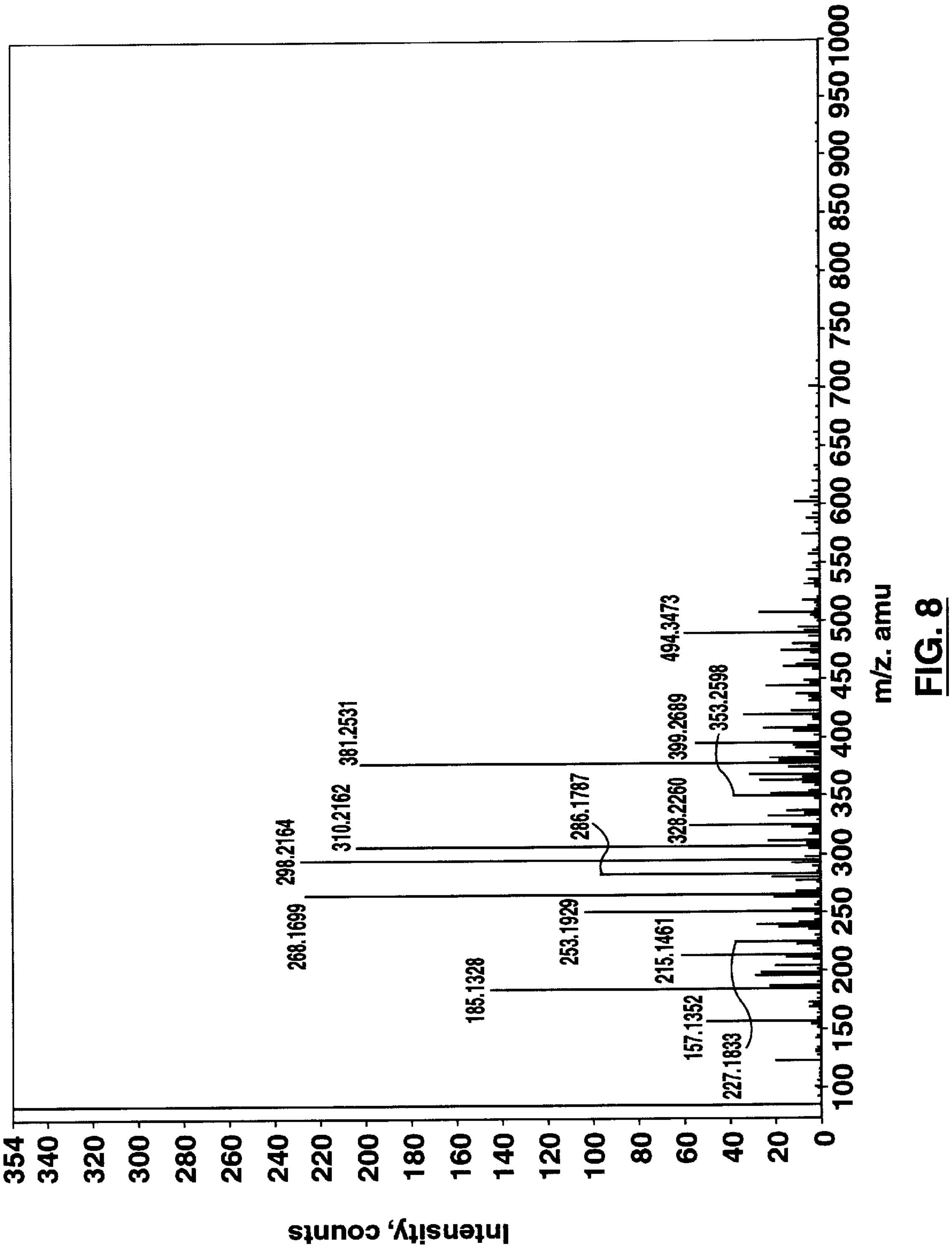
FIG. 8 shows a product ion spectrum obtained using conventional techniques.
Figure 9:
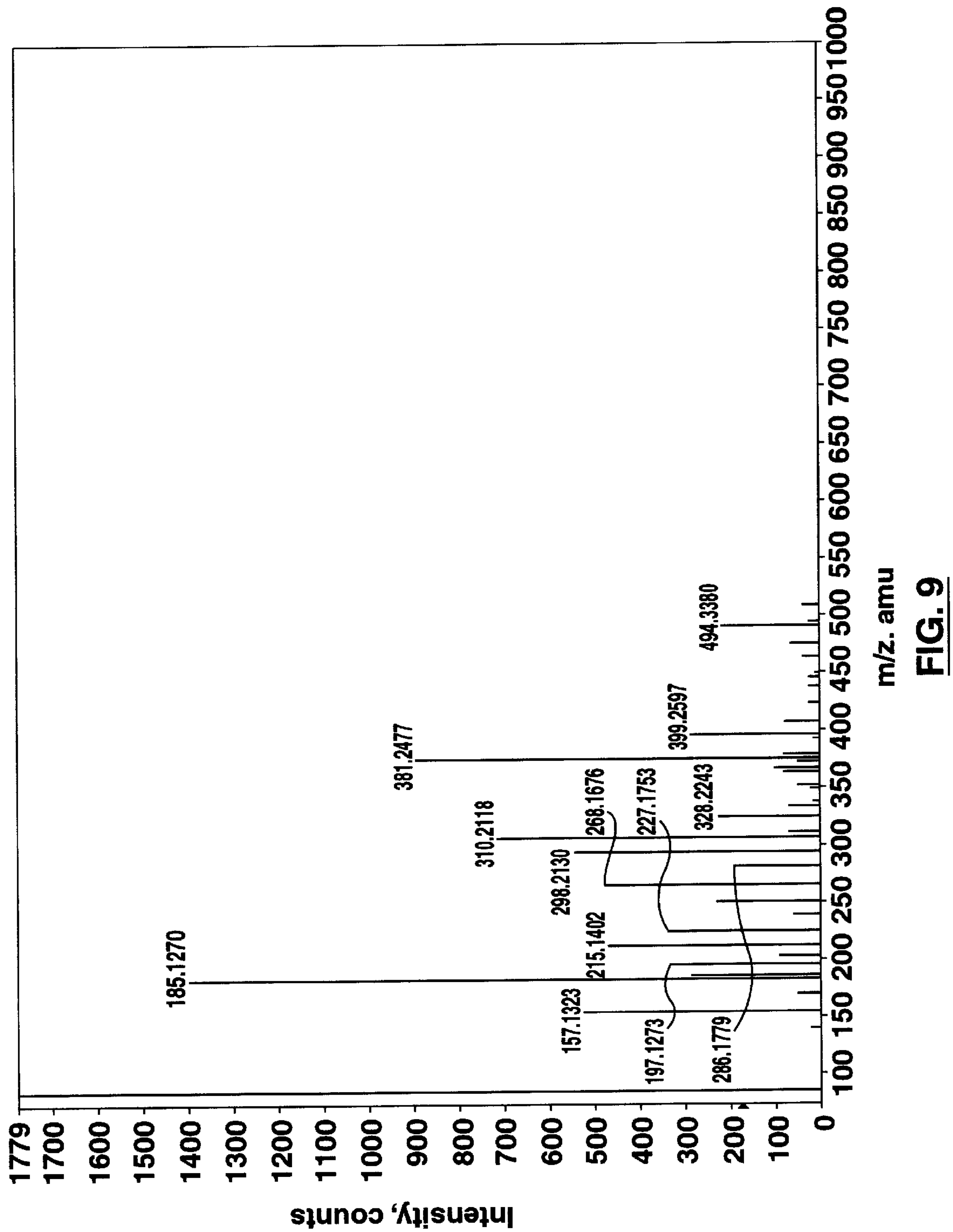
FIG. 9 shows a product ion spectrum obtained, for the same sample as in FIG. 8, in accordance with the present invention.

The spectrum in FIG. 8 shows a complete product ion spetrum of m/z 829, a singly charge peptide ion. Product ions from m/z 86 up to m/z 829 are present. This figure shows the intensity which is recorded in a normal mode of operation for an interval of one second, without the enhancement technique applied. FIG. 9 shows a spectrum of the same sample, acquired for the same time period, when The procedure is used to enhance the entire range of m/z values. In this case the range has been divided into 4 sub-intervals, to make up a complete 1 second interval with the following values of Q2, ΔTp and $t_D$ being used. It will be understood that, in both cases, Q1 would have been held fixed to select m/z 829, and that timing in the TOF section involved pulsing ions into the TOF section energy at a frequency which is not faster than that that required to allow die highest m/z ions to reach the detector between pulses. While higher frequency could be used for enhancement intervals, which correspond to lower m/z ions, there is no advantage to doing so since the trapping does not allow any ions to be wasted.

TABLE 2

| Interval | Q2 | ΔTp | tD |
|---|---|---|---|
| 1 | 60 | 14.2 | 32.8 |
| 2 | 120 | 20.1 | 46.5 |
| 3 | 240 | 28.4 | 65.7 |
| 4 | 480 | 40.2 | 92.9 |

It can be observed that each of the peaks in the spectrum of FIG. 9 is significantly larger than that in FIG. 8. For the major peaks in the spectrum, an average increase in intensity of a factor of approximately 5× has been achieved.

While the method has been described In application with a QqTOF tandem mass spectrometer system, it will be appreciated that the method can be applied to any orthogonal time-of-flight mass spectrometer system where it is desired to overcome mass-dependent duty-cycle losses and enhance a wide mass range, and where ions can be trapped and gated from a region upstream of the TOF pulsing region, and where the optimum parameters for enhancement are mass dependent. For example, this method could be applied to a quadrupole time-of-flight configuration such as described by Douglas in PCT Application WO 00/33350, or by Whitehouse in U.S. Pat. No. 6,011,259. It could also be employed for the same beneficial purpose described if the upstream mass spectrometer was a time-of-flight mass spectrometer, an ion trap mass spectrometer, a magnetic sector mass spectrometer, an ion mobility device, or any mass selective means which supplies ions into a collision cell or ion guide which can be used to trap ions and then release them into an orthogonal time-of-flight mass spectrometer. Although the application has been described for use with an electrospray type of ion source, it will be appreciated that it could be used for any type of ion source such as MALDI, electron impact, inductivity coupled plasma (ICP), chemical ionization, atmospheric pressure chemical ionization (APCI) etc. It should be recognized that the product ions in the collision cell may not simply be fragments of the precursor ions, but can also be reaction products formed in the cell at low or high energy by reactions with neutral gas molecules, which are added to the cell. Such ion-molecule reactions can be useful in order to specifically detect certain chemical spaces by means of their reaction, or may be used in order to remove interferences. Any products of a precursor ion, whether fragment or cluster or reaction products, as well as unreacted precursor ions in the cell, will be suitable enhanced by the method of the present invention described.

It will be recognized that although the invention has been described with a collision cell, which includes a quadrupole rod set for ion containment, other similar RF devices such as RF hexapole, octopole or other multipole with more than eight rods will work as well as a quadrupole. In addition, an RF ring guide or RF ion funnel is well known in the art for providing ion containment and ion trapping and can also function in the collision cell to allow ions to be trapped and released.

What is claimed is:

1. A method of effecting mass analysis on an ion stream, the method comprising:

(1) providing a stream of ions having different mass to charge ratios;

(2) trapping the ions in an ion trap;

(3) periodically releasing, from the trapped ions, ion pulses into a mass analyzer, to detect ions with a second mass to charge ratio; and (4) providing a delay between the release of the ion pulses and initiation of mass analysis in the mass analyzer, and adjusting the delay to improve the duty cycle efficiency in the mass analyzer for ions with a desired mass to charge ratio.

2. A method as claimed in claim 1, which includes effecting mass analysis in a time of flight instrument provided as said mass analyzer, and adjusting the duration of each ion pulse to improve the duty cycle efficiency of ions with the desired mass to charge ratio.

3. A method as claimed in claim 2, wherein the delay of step (4) comprises providing a time delay between each ion pulse and initiation of a drive pulse in the time of flight instrument, and adjusting the duration of each ion pulse and the time delay to improve the duty cycle for a range of ion mass to charge values, including the desired mass to charge ratio.

4. A method as claimed in claim 3, wherein the mass analysis step (4) comprises mass analyzing ions in a relatively broad range of mass to charge ratios the method including: enhancing the sensitivity for different ion mass to charge ratio by providing a series of intervals during each of which the ion pulse duration and the time delay are optimized for a relatively narrow range of mass to charge values, and setting the narrow ranges of mass to charge ratios to cover together all of the broad range of mass to charge ratios, whereby substantially all ions in the broad range of mass to charge ratios are given an improved duty cycle.

5. A method as claimed in claim 4, which includes providing a center mass to charge ratio for each narrow range of mass to charge ratios, and selecting the center mass charge ratios such that each of the center mass to charge ratios, except for the smallest mass to charge ratio, is a multiple of a smaller center mass to change ratio.

6. A method as claimed in the claim 5, which includes selecting the narrow ranges of mass to charge ratios to overlap with one another.

7. A method as claimed in claim 4, 5 or 6, which includes setting the pulse duration and the time delay as a function of the center mass of each narrow range of mass to charge ratios.

8. A method as claimed in claim 7, which includes setting each of the pulse duration and the time delay as a multiple of a square root of the corresponding center mass to charge ratio.

9. A method as claimed in any one of claims 1 to 3, which includes:

(a) passing the ion stream through a first mass analyzer to select a precursor ion with a desired mass to charge ratio;

(b) subjecting the precursor ions to at least one of the collision-induced dissociation and reaction to generate product ions; and (c) passing the product ions into the ion trap to effect step (2);

wherein the mass analysis and the mass analyzer of step (3) comprise a second mass analysis of the product ions in a second mass analyzer.

10. A method as claimed in claim 9, which includes effecting said at least one of collision-induced dissociation and reaction in a collision cell including an RF containment device selected from the group comprising a quadrupole rod set, a hexapole rod set, an octopole rod set, an RF multipole rod set with more than eight rods, an RF ring guide and an RF ion funnel; and adjusting the RF voltage applied to the RF containment device, to optimize transmission of ions in a desired range of mass to charge ratios.

11. A method as claimed in claim 9, which includes in step (a) sequentially scanning over a range of masses, to effect a parent ion scan.

12. A method as claimed in claim 9, which includes, in step (a), scanning the first mass analyzer over a desired range of first mass to charge ratios and in the second mass analysis recording ions with a second mass to charge ratio with a substantially constant neutral mass loss between the first and second mass-to-charge ratios, whereby a neutral loss scan is effected, and simultaneously adjusting said delay to improve the duty cycle efficiency for ions with the second mass-to-charge ratio.

13. A method as claimed in claim 9, which includes the following additional steps:

sequentially setting the first mass analyzer to select non-contiguous parent ions with selected parent mass-to charge ratios;

for each selected parent mass-to charge ratio, adjusting the delay for detection of a corresponding product ion;

whereby the second mass analysis indicates the presence of each product ion generated from the corresponding parent ion, to effect a multiple reaction monitoring (MRM) scan.

14. A method as claimed in any one of claims 4 to 6, which includes:

(a) passing the ion stream through a first mass analyzer to select a precursor ion with a desired mass to charge ratio;

(b) subjecting the precursor ions to at least one of the collision-induced dissociation and reaction, to generate product ions; and (c) passing the product ions into the ion trap to effect step (3);

(d) wherein the mass analysis and the mass analyzer of step (4) comprise a second mass analysis of the product ions in a second mass analyzer.

15. A method as claimed in claim 14, which includes effecting collision-induced dissociation and reaction in a collision cell including an RF containment device selected from the group comprising a quadrupole rod set, a hexapole rod set, an octopole rod set, an RF multipole rod set with more than eight rods, an RF ring guide and an RF ion funnel; and adjusting the RF voltage applied to the RF containment device, to optimize transmission of ions in each of the narrow range of mass to charge ratios.

16. A method as claimed in claim 14, which includes in step (a) sequentially scanning over a range of masses, to effect a parent ion scan.

* * * * *

UNITED STATES PATENT AND TRADEMARK OFFICE

CERTIFICATE OF CORRECTION

PATENT NO. : 6,507,019 B2

DATED : January 14, 2003

INVENTOR(S) : Igor Chernushevich and Bruce Thomson

It is certified that error appears in the above-identified patent and that said Letters Patent is hereby corrected as shown below:

Title page,
Item [73], Assignee, please correct to read as follows:
-- MDS Inc., doing business as MDS Sciex --

Signed and Sealed this

Seventh Day of June, 2005

JON W. DUDAS
*Director of the United States Patent and Trademark Office*